United States Patent
Lys et al.

(10) Patent No.: US 9,681,507 B2
(45) Date of Patent: Jun. 13, 2017

(54) SWITCHED-MODE CONVERTER CONTROL FOR LIGHTING APPLICATIONS

(71) Applicant: Cree, Inc., Durham, NC (US)

(72) Inventors: Ihor Lys, La Jolla, CA (US); Ashish Ekbote, Carpinteria, CA (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/553,004

(22) Filed: Nov. 25, 2014

(65) Prior Publication Data
US 2015/0257216 A1   Sep. 10, 2015

Related U.S. Application Data

(60) Provisional application No. 61/950,569, filed on Mar. 10, 2014.

(51) Int. Cl.
H05B 33/08   (2006.01)

(52) U.S. Cl.
CPC ..... *H05B 33/0815* (2013.01); *H05B 33/0848* (2013.01); *Y02B 20/346* (2013.01)

(58) Field of Classification Search
CPC  H05B 33/08; H05B 33/0815; H05B 33/0818; H05B 37/029; H05B 37/02; H02M 3/33546
USPC ....................... 315/294, 32, 200 R, 307, 201
See application file for complete search history.

(56) References Cited

U.S. PATENT DOCUMENTS

| | | | | |
|---|---|---|---|---|
| 7,557,521 B2* | 7/2009 | Lys | ...................... | F21S 48/325 315/224 |
| 2011/0043121 A1* | 2/2011 | Matsuda | ............ | H05B 33/0839 315/224 |
| 2011/0074292 A1* | 3/2011 | Maehara | ............ | H05B 33/0815 315/32 |
| 2012/0169240 A1* | 7/2012 | Macfarlane | ......... | H02M 1/4225 315/152 |
| 2012/0200229 A1* | 8/2012 | Kunst | ................ | H05B 33/0815 315/186 |
| 2012/0200230 A1* | 8/2012 | Esaki | .................. | H05B 33/0851 315/200 R |
| 2013/0141003 A1* | 6/2013 | Esaki | ..................... | H05B 37/02 315/224 |
| 2013/0328505 A1* | 12/2013 | Sadwick | .............. | H05B 39/041 315/307 |
| 2014/0009085 A1* | 1/2014 | Veskovic | ............... | H05B 33/08 315/307 |

* cited by examiner

*Primary Examiner* — Douglas W Owens
*Assistant Examiner* — Syed M Kaiser
(74) *Attorney, Agent, or Firm* — Coats & Bennett, PLLC (57) ABSTRACT

An apparatus includes a switched-mode converter circuit having an output configured to be coupled to at least one light-emitting device. The apparatus further includes a control circuit configured to generate a measure of a voltage magnitude of a time-varying voltage applied to an input of the switched-mode converter circuit and a measure of a dimming level to be applied to the at least one light-emitting device. The control circuit is configured to control a switch of the switched-mode converter circuit responsive to the generated measures. The control circuit may be implemented using functional units of a microcontroller.

33 Claims, 8 Drawing Sheets

SWITCHED-MODE CONVERTER CONTROL FOR LIGHTING APPLICATIONS

CROSS-REFERENCE TO RELATED APPLICATIONS

The present application claims priority of U.S. Provisional Application Ser. No. 61/950,569, filed on Mar. 10, 2014 entitled SWITCHED-MODE CONVERTER CONTROL FOR LIGHTING APPLICATIONS, the entire disclosure of which is incorporated herein by reference.

FIELD

The present inventive subject matter relates to power conversion apparatus and methods and, more particularly, to switched-mode converter control for solid-state and other lighting apparatus.

BACKGROUND

Solid-state lighting arrays are used for a number of lighting applications. For example, solid-state lighting panels including arrays of solid-state light emitting devices have been used as direct illumination sources in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are also used in lighting fixtures, such as incandescent bulb replacement applications, task lighting, recessed light fixtures and the like. For example, Cree, Inc. produces a variety of recessed downlights, such as the LR-6 and CR-6, which use LEDs for illumination. Solid-state lighting panels are also commonly used as backlights for small liquid crystal display (LCD) screens, such as LCD display screens used in portable electronic devices, and for larger displays, such as LCD television displays.

Solid-state lighting devices are commonly driven by switching power converter circuits, such as boost converters, buck converter, buck-boost converters, and the like. Such converters may use current and/or voltage feedback to regulate power provided to the light-emitting devices or may operate without such feedback. Various switched-mode power control techniques for LED lighting apparatus are described in, for example, U.S. Pat. No. 7,557,521 to Lys.

SUMMARY

Some embodiments provide an apparatus including a switched-mode converter circuit having an output configured to be coupled to at least one light-emitting device. The apparatus further includes a control circuit configured to generate a measure of a voltage magnitude of a time-varying voltage applied to an input of the switched-mode converter circuit and a measure of a dimming level to be applied to the at least one light-emitting device. The control circuit is further configured to control a switch of the switched-mode converter circuit responsive to the generated measures. The switched-mode converter may be controlled without knowledge of current passing through the at least one light-emitting device.

In some embodiments, the control circuit may include a voltage detector configured to generate a magnitude signal indicative of the voltage magnitude, a mapping circuit configured to map the magnitude signal to a pulse duration signal and a pulse generation circuit configured to generate a pulse width modulated signal responsive to the pulse duration signal. The switch of the switched-mode converter circuit may operate responsive to the pulse width modulated signal.

The control circuit may further include a dimming level detection circuit configured to generate a dimming signal representative of the dimming level and a dimming compensation circuit configured to generate a dimming compensation signal responsive to the dimming signal. The pulse generation circuit may be configured to generate the drive pulse signal responsive to the pulse duration signal and the dimming compensation signal. The control circuit may include a scaling circuit configured to scale the pulse duration signal responsive to the dimming compensation signal and the pulse generation circuit may be configured to generate the drive pulse signal responsive to the scaled pulse duration signal.

In some embodiments, the dimming level detection circuit includes a phase cut detection circuit configured to generate a phase cut signal indicative of a phase cut applied to the time-varying voltage. The dimming compensation circuit may be configured to generate the dimming compensation signal responsive to the phase cut signal. The dimming compensation circuit may be configured to map a non-zero phase cut to a minimum dimming level.

In further embodiments, the switched-mode converter circuit may include an energy storage device and the pulse generation circuit may be configured to initiate a pulse of the pulse width modulated signal responsive to a pulse initiation signal. The control circuit may further include a detector circuit configured to generate the pulse initiation signal responsive to discharge of the energy storage device. The energy storage device may include an inductor. The detector circuit may be configured to generate the pulse initiation signal responsive to a voltage at a terminal of the inductor.

In some embodiments, the voltage detector circuit may include a peak detector circuit configured to generate a peak voltage signal representative of a peak voltage of the time-varying voltage. The mapping circuit may be configured to generate the pulse duration signal responsive to the peak voltage signal. The control circuit may further include a phase cut detection circuit configured to generate a phase cut signal representative of a phase cut applied to the time-varying voltage and a peak voltage compensation circuit configured to scale the peak voltage signal responsive to the phase cut signal. The mapping circuit may be configured to generate the pulse duration signal responsive to the scaled peak voltage signal. The peak voltage compensation circuit may be configured to scale the peak voltage signal when the phase cut signal indicates a phase cut greater than a predetermined amount and to forego scaling the peak voltage signal when the phase cut signal indicates a phase cut less than the predetermined amount. The predetermined amount may be greater than about a quarter of a cycle of the time-varying voltage.

In some embodiments, the control circuit includes a microcontroller. The apparatus may further include a rectifier circuit having an input configured to be coupled to an AC power source and an output coupled to the input of the switched-mode converter circuit. The apparatus may also include the at least one light emitting device. The at least one light emitting device may include at least one LED.

Some embodiments of the inventive subject matter provide an apparatus including a switched-mode converter circuit configured to be coupled to at least one light-emitting device and to transfer power thereto responsive to a pulse width modulated signal. The apparatus further includes a microcontroller configured to provide a voltage detection unit configured to generate a first digital value representative of a magnitude of a time-varying voltage applied to an input of the switched-mode converter circuit, a dimming level detection unit configured to generate a second digital value representative of a dimming level, a mapping unit configured to generate a pulse duration value responsive to the first digital value, a dimming compensation unit configured to scale the pulse duration value responsive to the second digital value and a programmable switched-mode control (PSMC) unit configured to generate the pulse width modulated signal responsive to the scaled pulse duration value.

The mapping unit may be configured to generate the pulse duration value responsive to the first and second digital values.

The voltage detection unit may include an analog-to-digital converter (ADC) unit configured to generate digital voltage samples representative of a time-varying voltage applied to an input of the switched-mode converter circuit and a peak detector unit configured to generate the first digital value from the digital voltage samples.

The dimming level detection unit may include a phase cut detection unit. The phase cut detection unit may include an analog comparator unit configured to generate a digital pulse signal responsive to the time-varying voltage and a capture unit configured to generate the second digital value responsive to the digital pulse signal. The analog comparator unit may include a first analog comparator unit and the microcontroller may be further configured to provide a second analog comparator unit configured to generate a pulse initiation signal responsive to discharge of an energy storage device of the switched-mode converter circuit and the PSMC unit may be configured to initiate a pulse of the pulse width modulated signal responsive to the pulse initiation signal.

The apparatus may further include a color point control circuit configured to be coupled to the at least one light-emitting device, and the microcontroller may be further configured to control the color point control circuit.

The apparatus may further include a rectifier circuit having an input configured to be coupled to an AC power source and an output coupled to an input of the switched-mode converter circuit. The apparatus may also include the at least one light emitting device, which may include at least one LED.

Further embodiments provide methods of operating a switched-mode converter circuit having an output coupled to at least one light-emitting device. The methods include generating a measure of a voltage magnitude of a time-varying voltage applied to an input of the switched-mode converter circuit, generating a measure of a dimming level to be applied to the at least one light-emitting device and controlling a switch of the switched-mode converter circuit responsive to the generated measures.

Generating a measure of a voltage magnitude of the time-varying voltage may include generating a measure of a peak voltage of the time-varying voltage. Controlling a switch of the switched-mode converter circuit responsive to the generated measures may include mapping the measure of the peak voltage to a pulse duration and applying the pulse duration to the switch.

Generating a measure of a dimming level to be applied to the at least one light-emitting device may include generating a measure of a phase cut applied to the time-varying voltage and applying the pulse duration to the switch may include adjusting the pulse duration based on the measure of the phase cut and applying the adjusted pulse duration to the switch. Mapping the measure of the peak voltage to a pulse duration may include adjusting the measure of the peak voltage based on the measure of the phase cut and mapping the adjusted measure of the peak voltage to the pulse duration. The methods may be performed by a microcontroller.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

Analog control systems for solid-state lighting applications can be cost effective, relatively efficient and can even provide some level of dimmer compatibility. However, commercially available analog solutions may not provide coverage of a desirable range of dimmers and converter topologies. Analog solutions may be difficult to apply in application that require mode switching and/or which use multiple conversion stages.

A potential limitation to microcontroller-based switched-mode converter designs is efficiently providing feedback in the digital domain during a switching cycle. Accordingly, conventional designs often include hardware support for what is commonly called the "current loop." Often this comes in the form of special circuitry to terminate the "on" time of the switch at the appropriate peak current. In this sense, such systems operate in a manner very similar to the analog implementations, except that digital processing can be used to provide the target current, and can therefore precisely control how the converter operates. This can be an advantage because determining the required current may involve long time constant operations, a task to which digital memories may better suited than corresponding analog circuitry. Generally, power supplies with a desirable power factor depend on slow time constants to prevent interaction between the power factor correction control and the voltage control. Additional logic can be used to reduce the required voltage and current margins on some of the components due to the additional knowledge.

In transition mode and discontinuous strategies, "on" time can be calculated from known voltages and the inductance and the conventional current loop can be eliminated. The general response of an inductor connected to an input source is that as a voltage of the input source increases, a converter with a fixed on time will draw more current approximately linearly and will draw power approximately quadratically. This response can provide a good power factor.

In LED lighting systems, the LED string typically controls the voltage. Some conventional designs use feedback of the LED current to set the lighting unit operating characteristics. This may result in several compromises due to the nature of the feedback. Fast feedback may result in poorer power factor and high third harmonic content at the input of the converter. Slow feedback may result in poor dimmer/dimming response, poor startup response, and incompatibility with dimmers.

Responding to input voltage variations does not require current feedback. Even very low cost processors typically can perform calculations used for discontinuous current mode (DCM) control, e.g., measuring the input voltage, taking its square root, multiplying by a calibration constant, and finally setting a new duty cycle. This calculation need only be performed occasionally. Depending on the nature of the input voltage variation, it may only be necessary to do the calculation once, e.g., at power up. Even if close tracking of input voltage variations is desired, calculating once every half cycle may be more than enough, as output capacitance may sufficiently smooth out rapid input variations.

Power calibration can be performed without knowledge of the output current and voltage if the input voltage and input current are known. This can be quite useful if the output needs to be isolated. The reduction in circuit complexity can be significant. Some embodiments of the inventive subject matter may employ digital control strategies based on the above considerations that can reduce variation to line input voltage, achieve desirable optical output when used on dimmed and non dimmed circuits, provide desirable start up, and provide desirable efficiency, even during dimming Incandescent lamps are voltage dependent devices, although the power dependence is somewhat reduced due to the input resistance variation that appears due to the filament heating up a little hotter at higher input voltage, and thus having a higher resistance. This effect in light output is magnified by the efficiency improvement due to the hotter filament.

LED lamp performance could be judged in substantially the same fashion as incandescent lamps, i.e., output variation due to voltage variation is nominally acceptable. However, this type of output variation may be unacceptable, since it may require some additional de-rating of the lamp at nominal voltage, which may result in labeling as a less bright lamp.

Compensating for variation in input voltage in a lighting device driven by a switched-mode power converter according to some embodiments may include sensing the input voltage, processing the sensed signal to extract some measure of the voltage magnitude, applying a function which implements the inverse characteristic of the switched-mode converter, and controlling the switched-mode converter based on the output of the function.

Calculating root-mean-square (RMS) input voltage may be difficult in a microcontroller with no multiply or divide hardware. According to some embodiments, peak or average values may be used, as peak and average values may be substantially easier to calculate. The peak value has the potential advantage of being relatively insensitive to dimmer angle for a part of the dimmer's range.

A typical triac dimmer does not fire until sometime after the zero volt cross over point. The delay in triggering may be substantial, e.g., between 30 and 60 degrees when the dimmer is at 100% output (minimum dimming level). This may be problematic because a lamp powered by a dimmer may not produce its rated output at minimum dimming level. With incandescent lamps, a potential solution is to install a higher wattage lamp. However, LED lamps are generally not available in a wide array of sizes, and higher wattage lamps may be substantially more expensive, even if they are available. According to some embodiments, a control circuit for a switched-mode power supply used to drive LEDs may compensate for this characteristic of conventional dimmers.

Properly sensing the peak voltage may be difficult. Analog peak finder circuits utilizing an op-amp may be used. A microcontroller driving a switched-mode converter could read the peak voltage with its A/D at any time from such a circuit, and responsively update the "on" time of the converter's power switch. According to some embodiments, the time varying input voltage may be oversampled with the A/D and the peak voltage calculated from the samples instead of using an analog peak finder circuit. This technique has the potential advantage that its response can be fine tuned and other information may be used to improve the measurement.

Substantial oversampling may be required to extract an accurate estimate of the peak value of a rectified waveform. Ordinary sinusoids are quite flat at their peaks, so the required oversampling rate may not be very large. However, a phase cut waveform has much sharper peaks, particularly when more than 100 degrees of the original waveform have been removed.

According to some embodiments, dimming phase cut may be determined using a control circuit that compares the input voltage waveform to a threshold to generate a pulse signal and uses a counter to determine the magnitude of the phase cut from the pulse signal. Since the cutoff angle can be determined and its effect predicted, arbitrary dimmer response curves can be programmed.

Figure 1:
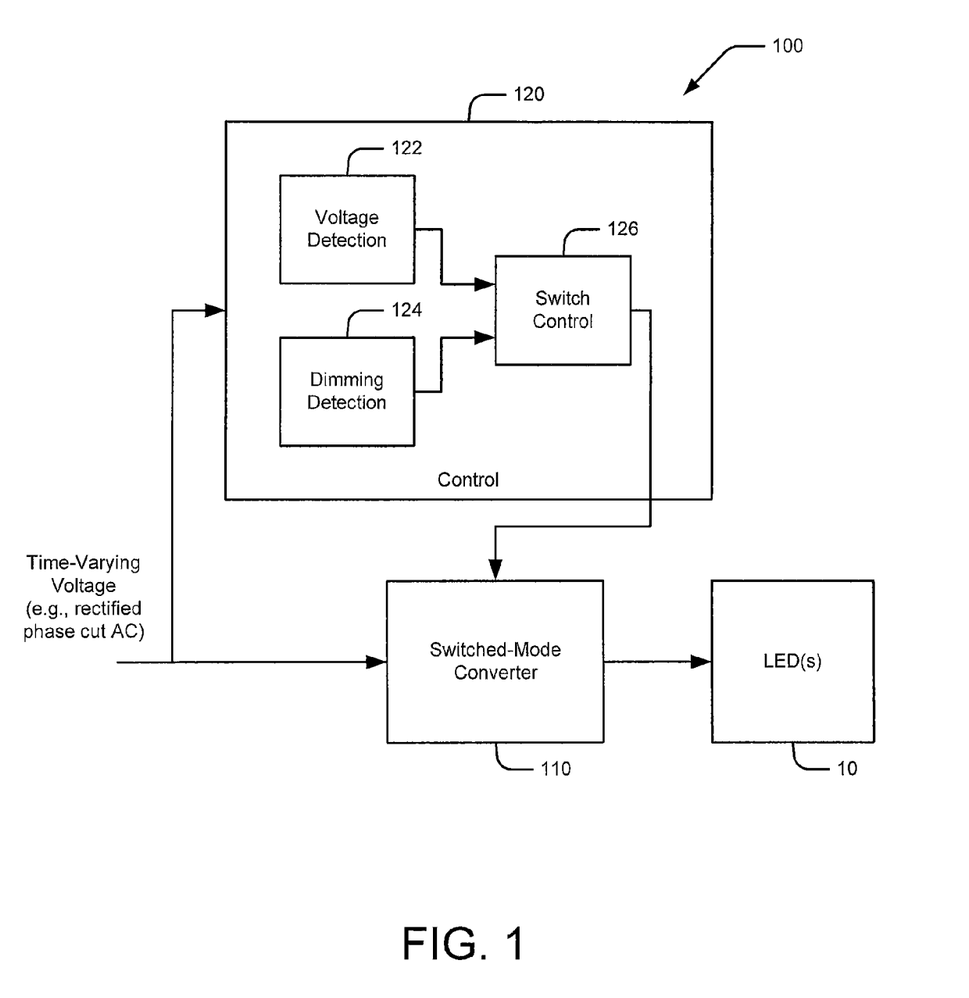
FIG. 1 is a schematic diagram illustrating a lighting apparatus according to some embodiments.

FIG. 1 illustrates a lighting apparatus 100 according to some embodiments of the inventive subject matter. The lighting apparatus 100 includes at least one light emitting device, e.g., one or more light emitting diodes (LEDs) 10. The one or more LED(s) 10 are driven by a switched-mode converter circuit 110 from a power source that provides a time-varying voltage, such as a rectified voltage produced by a rectifier from an AC source. The apparatus 100 further includes a control circuit 120 configured to generate measures of a voltage magnitude of the time-varying voltage and a dimming level to be applied to the one or more LED(s) 10 using, for example, respective voltage detection and dimming level detection circuits 122, 124. Dimming level information that is detected may be a phase cut applied to the time-varying voltage and/or a separate dimming input, such as a 0-10V, 1-10V or digital dimming input. The control circuit 120 further comprises a switch timing control circuit 126 configured to control a timing of a power switch of the switched-mode power converter circuit 110 responsive to the generated measures.

It will be understood that the apparatus 100 may be implemented in any of a number of different ways. For example, the at least one LED 10 may include a single device or various arrangements of LEDs, such as various serial and parallel arrangements of devices. The switched-mode converter circuit 110 may take various forms, including, but not limited to, boost converter, buck converter, buck-boost converter and the like. The control circuit 120 may be implemented using analog circuitry, digital circuitry (e.g., microprocessor, microcontroller, ASIC, etc.) or combinations thereof.

Figure 2:
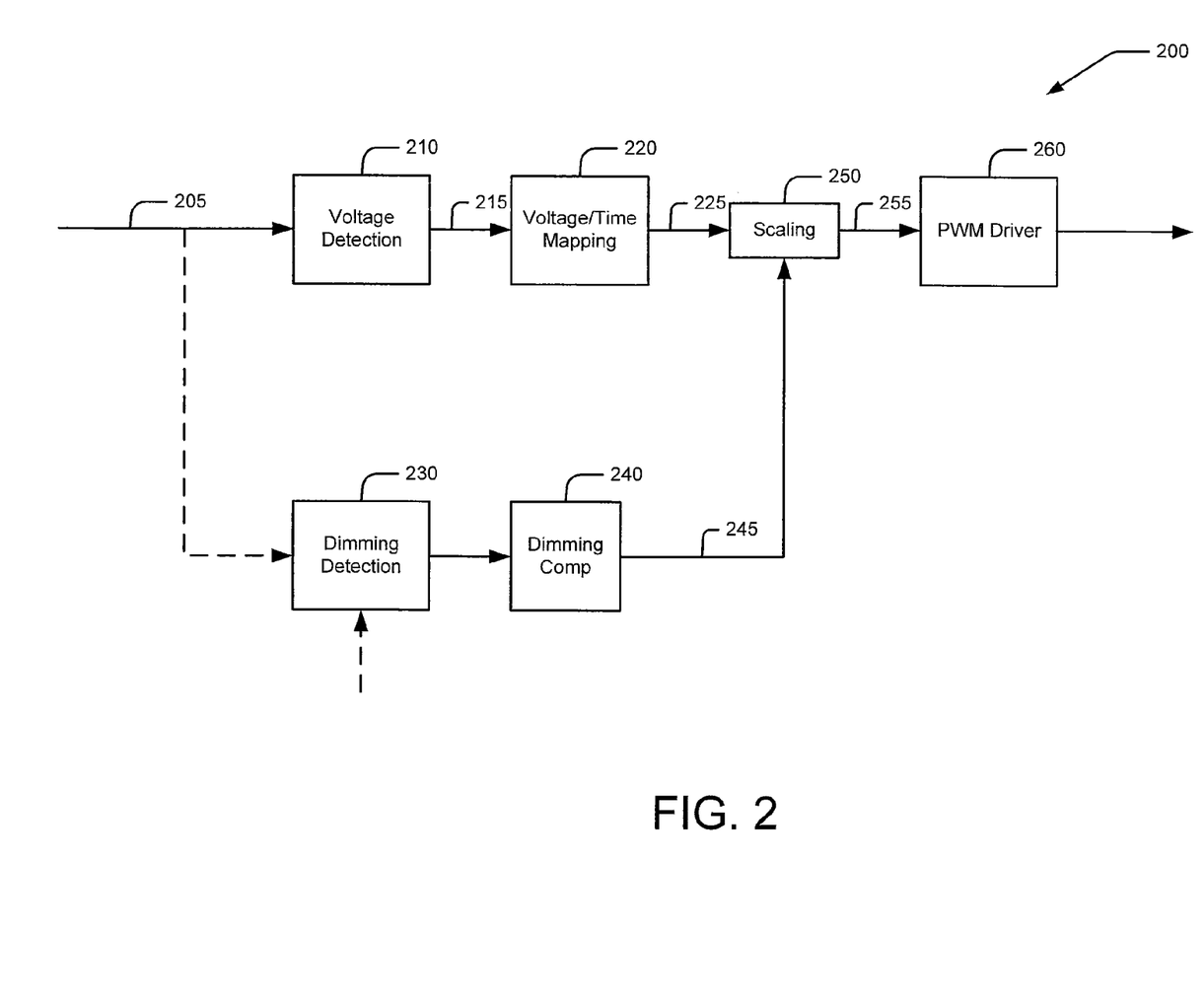
FIG. 2 is a schematic diagram illustrating a control circuit for a lighting apparatus according to some embodiments.

According to some embodiments, a control circuit may use a voltage-to-pulse width mapping that may be adjusted for action of a dimmer. The resulting PWM drive signal may be used to control a switched-mode converter circuit that provides power to LEDs. Referring to FIG. 2, a control circuit 200 may include a voltage detection circuit 210 that is configured to generate a magnitude signal 215 representing a voltage magnitude of a time-varying signal 205, such as a full-wave rectified signal produced by a rectifier. A mapping circuit 220 generates a pulse duration signal 225 from the magnitude signal 215 produced by the voltage detection circuit 210.

The control circuit 200 further includes a dimming level detection circuit 230 that is configured to generate a dimming signal 235 representing a dimming level associated to the time-varying signal 205. For example, the dimming level may be indicated by a phase cut applied to the time-varying signal 205, and the dimming level detection circuit 230 may be configured to generate a dimming signal 235 representative of the phase cut. In further embodiments, the dimming level may be given by an analog signal, such as a 0-10V or 1-10V signal, or a digital signal, such as a PWM dimming signal or a DALI signal, and the dimming level detection circuit 230 may be configured to generate a dimming signal translated from such an input.

A dimming compensation circuit 240 generates a dimming compensation signal 245 from the dimming signal 235 produced by the dimming level detection circuit 230. A scaling circuit 250 scales the pulse duration signal 225 according to the dimming compensation signal 245. The scaling may represent a factor by which the pulse duration indicated by the pulse duration signal 225 is to be changed to account for the dimming. The scaled pulse duration signal 255 produced by the scaling circuit 250 is applied to a PWM driver circuit 260, which responsively produces a drive signal 265. The drive signal 265 may drive one or more power switches of a switched-mode converter circuit.

Figure 3:
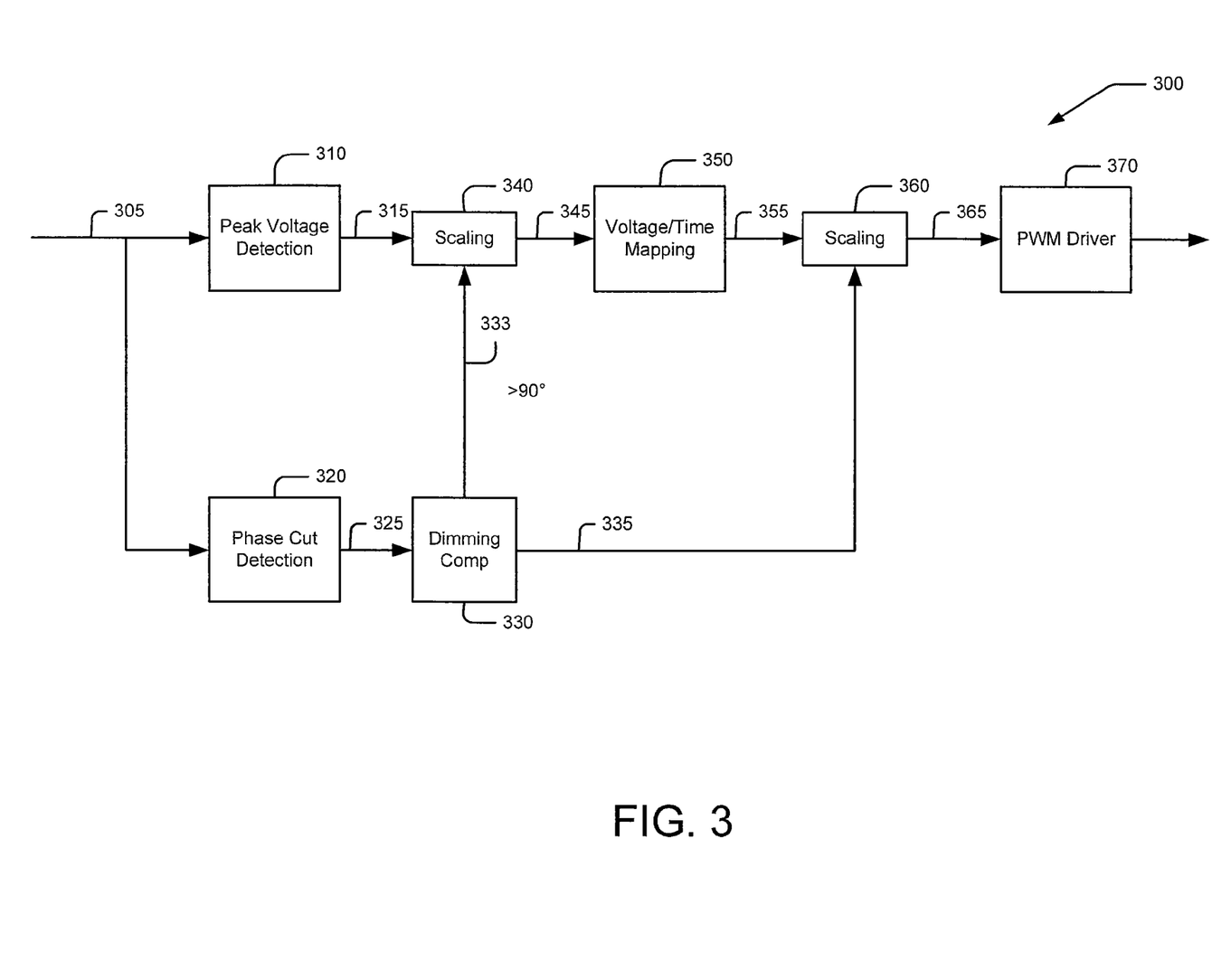
FIG. 3 is a schematic diagram illustrating a control circuit for a lighting apparatus according to further embodiments.

According to further embodiments, a peak voltage detector may be used to provide voltage detection, with a phase cut detector output being used to both scale pulse duration, as described above, and to correct peak measurements when a phase cut applied by t dimmer effects peak measurements. Referring to FIG. 3, a control circuit 300 includes a peak voltage detection circuit 310 which is configured to produce a peak voltage signal 315 representing a peak voltage of a time-varying signal 305. The control circuit 300 further includes a phase cut detection circuit 320, which is configured to generate a phase cut signal 325 representing a phase cut applied to the time-varying signal 305 by a dimmer. A dimming compensation circuit 330 is configured to generate a peak correction signal 333 responsive to the phase cut signal 325. The peak correction signal 333 is applied to a scaling circuit 340, which responsively scales the peak voltage signal 315 to produce a scaled peak voltage signal 345.

A mapping circuit 350 generates a pulse duration signal 355 from the scaled peak voltage signal 345. A scaling circuit 360 scales the pulse duration signal 355 according to a dimming compensation signal 335 produced by the dimming compensation circuit 330. The scaled pulse duration signal 365 is applied to a PWM driver circuit 370, which responsively controls a switched-mode converter circuit.

The time-varying signal 305 may be a rectified voltage produced by a rectifier from a phase-cut AC signal output by a dimmer. If the dimmer applies a greater than 90 degree phase cut to the AC signal, the peak voltage identified by the peak voltage detector could result in an erroneous mapping of the peak voltage signal 315 to the pulse duration signal 345. The scaling applied to the peak voltage signal 315 responsive to the phase cut can compensate for this error.

Figure 4:
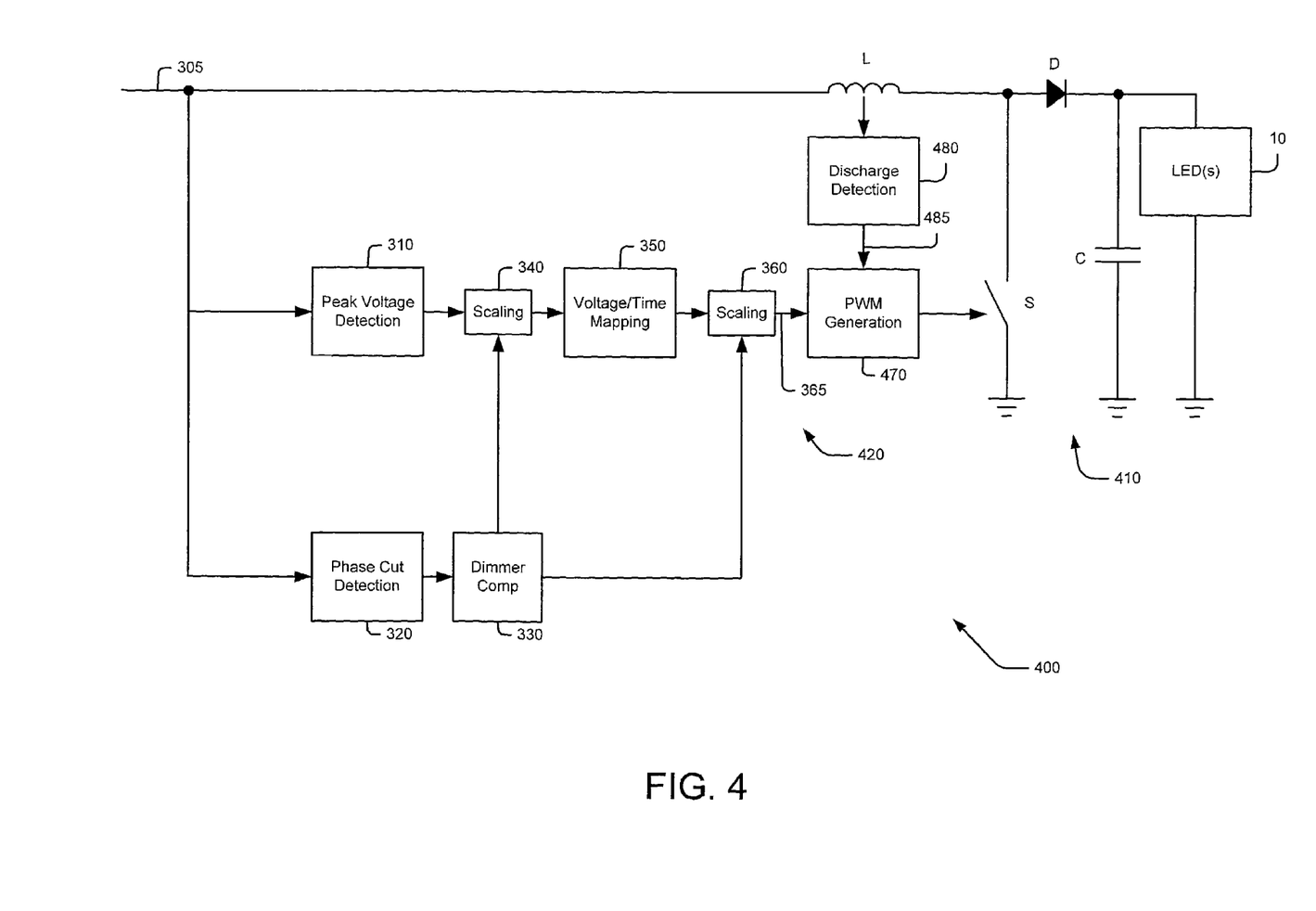
FIG. 4 is a schematic diagram illustrating a boost converter in a lighting apparatus according to some embodiments.

According to further embodiments, reduced voltage switching may be provided. Referring to FIG. 4, a lighting apparatus 400 includes a boost converter circuit 410 including an inductor L, a diode D and a power switch S, and is configured to transfer energy to at least one LED 10. A control circuit 420 provides a drive signal to operate the switch S. The control circuit 420 includes a peak voltage detection circuit 310, a phase cut detection circuit 320, a dimming compensation circuit 330, a scaling circuit 340, a mapping circuit 350, and a scaling circuit 360 along the lines described above with reference to FIG. 3. The control circuit 420 further includes a PWM driver circuit 470 that receives a pulse duration signal from the scaling circuit 360 and further receives a pulse initiation signal 485 generated by a discharge detection circuit 480 responsive to a discharge of the inductor L. The PWM driver circuit 470 responsively controls the switch S using a timing based on a discharge state of the inductor L. In particular, responsive to discharge of the inductor L, the PWM generation circuit 470 may close the switch S for a duration corresponding to the pulse duration signal received from the scaling circuit 360.

It will be understood that the control circuitry described above may be implemented using analog circuitry and/or digital circuitry. Accordingly to some embodiments, a microcontroller may be used to implement much of the control circuitry described above.

Figure 5:
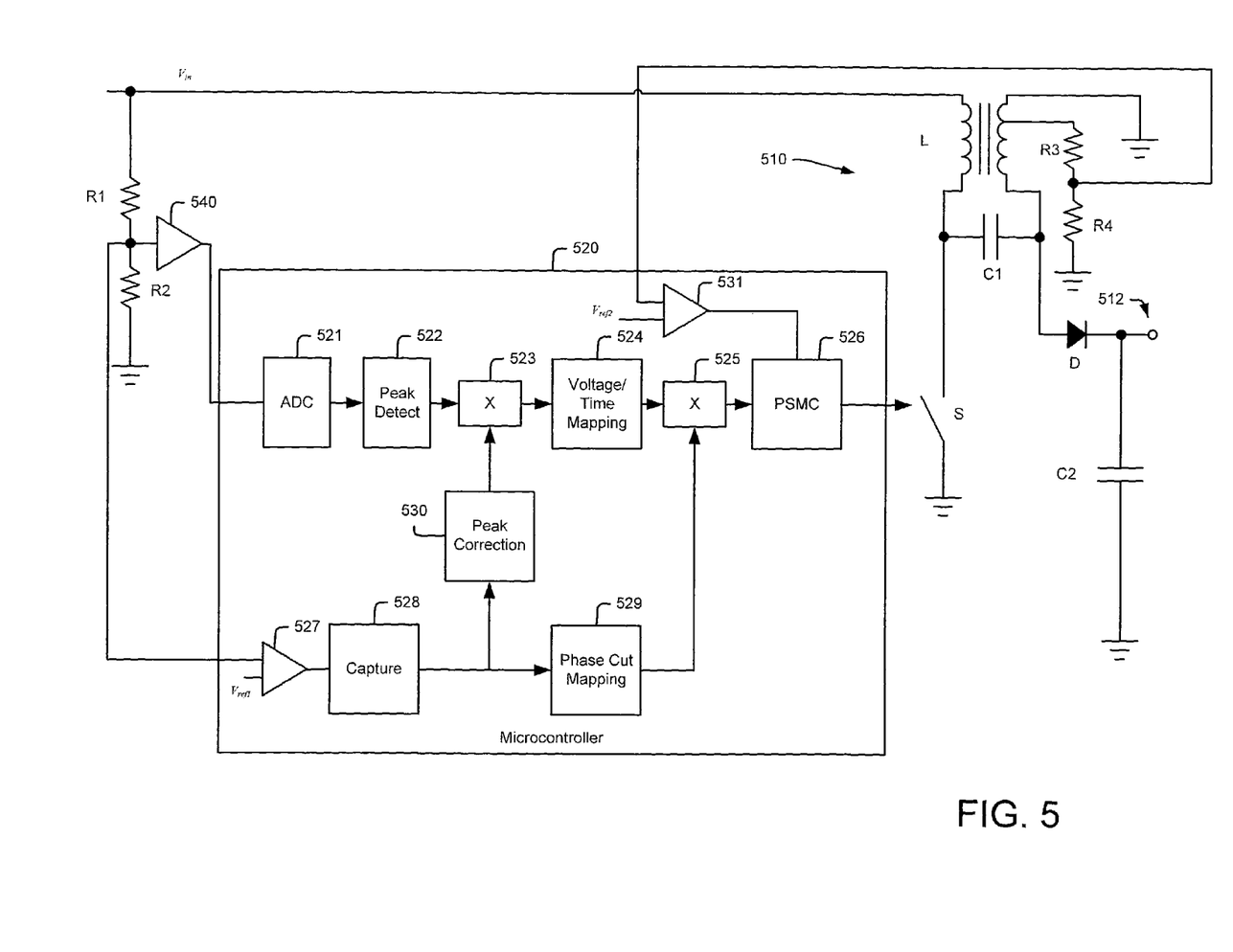
FIG. 5 is a schematic diagram illustrating a microcontroller-controlled boost converter in a lighting apparatus according to further embodiments.

FIG. 5 illustrates an apparatus using a microcontroller-based control circuit for driving one or more LEDs according to further embodiments. The apparatus includes a single-ended primary-inductance converter (SEPIC) circuit 510 including a coupled inductor L having a primary winding configured to be coupled to a power source (e.g., a rectifier) that produces a time-varying voltage $v_{in}$, e.g., a full-wave rectified voltage produced from a phase cut AC signal produced by a dimmer A switch S, which may include, for example, a power transistor (e.g., an IGBT or power MOSFET) and associated drive circuitry, is coupled in series with the primary winding of the coupled inductor L and configured to control a current flowing therethrough. A secondary winding of the inductor L is coupled to the primary winding by a capacitor C1 and to a diode D and a capacitor C2 that are coupled at an output 512. The output 512 of the SEPIC circuit 510 is configured to be coupled to one or more LEDs.

A microcontroller 520 is configured to drive the switch S of the SEPIC circuit 510. The microcontroller 520 includes a variety of analog and digital functional units. These functional units including an analog-to-digital converter (ADC) 521, which is configured to sample voltages produced from a voltage divider including resistors R1, R2 via a buffer circuit 540. The voltage samples are converted to digital voltage values, which are representative of the time varying voltage $v_{in}$. These digital voltage values are passed to a peak detection unit 522, which identifies a value corresponding to a peak value of the time-varying voltage $v_{in}$.

The output of the voltage divider is also passed to a first comparator unit 527 of the microcontroller 520. The comparator unit 527 compares the output of the voltage divider to a first reference voltage $V_{ref1}$, and responsively generates a digital output signal corresponding to the time-varying voltage $v_{in}$. The output of the comparator unit 527 is passed to a capture unit 528, which produces a digital value representing a measure of an amount of phase cut applied to the time-varying voltage $v_{in}$.

A peak correction unit 530 generates a scaling factor responsive to the output of the capture unit 528, and a first scaling unit 523 applies the scaling factor to the output of the peak detection circuit 523 to produce a scaled peak voltage value. The scaling may be such that, as explained above, if the phase cut applied to the time-varying voltage $v_{in}$ is greater than 90 degrees, the value produced by the peak detection unit 522 is appropriately corrected.

The scaled peak voltage value is applied to a mapping unit 524, which applies a voltage/pulse duration mapping to produce a pulse duration value. The mapping may be implemented in a number of different ways, such as by using a closed functional expression, a look up table or the like.

The phase cut value produced by the capture unit 528 is also applied to a mapping unit 529 that produces a scaling factor. The mapping enables the implementation of arbitrary dimming responses and may be implemented in a number of different ways, such as by using a closed functional expression, a look up table or the like.

A second scaling unit 525 receives the scaling factor and the pulse duration value, and responsively produces a scale pulse duration which is adjusted for the dimming level applied to the time-varying voltage $v_{in}$. The scaled pulse duration value is provided to a programmable switched-mode controller (PSMC) unit 526, which produces a pulse width modulated (PWM) signal to control the switch S.

Timing of the PWM signal is controlled responsive to the output of a second comparator unit 531. The second comparator unit 531 compares a second reference voltage $V_{ref2}$ to a voltage produced by a second voltage divider including resistors R3, R4 and coupled to a tap of the secondary winding of the coupled inductor L. The second voltage divider and the second comparator unit 531 are used to detect when an approximately zero voltage condition corresponding to full discharge of the coupled inductor L exists across the switch S. This enables near zero voltage switching by the PSMC unit 526.

Figure 6:
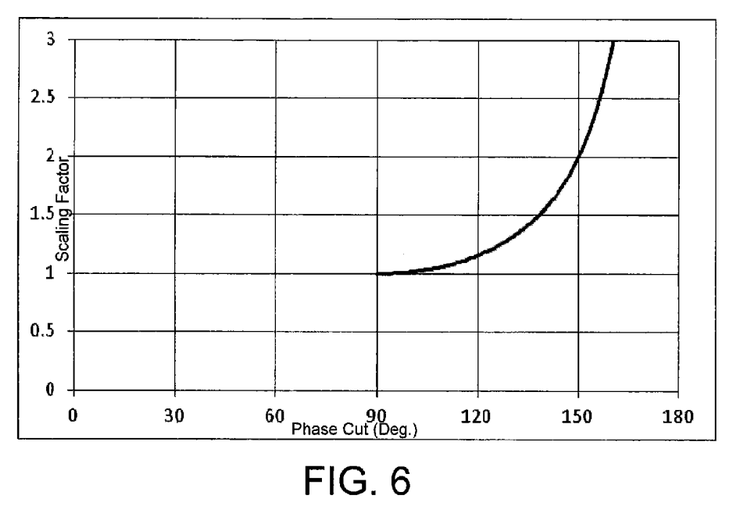
FIG. 6 is a graph of a peak voltage correction for dimming according to some embodiments.

According to some embodiments, a non-unity peak voltage scaling is applied by the peak voltage correction unit for phase cuts exceeding 90 degrees. FIG. 6 illustrates an example of a correction factor that may be used for the scaling factor (y-axis) for various phase cut values (x-axis) greater than 90 degrees. Such a scaling may be accomplished using a closed formula and/or a lookup table. This graph shows that an initial correction may be quite small and may not be necessary for phase cuts up to 120 degrees, at which point the sensed voltage error is just −15%. Above 120 degrees, the voltage error may rapidly increase. Many dimmers do not apply phase cuts greater than 135 degrees, at which point the correction factor is approximately 1.5.

Some embodiments may forego peak voltage compensation for phase cuts over 90 degrees. Some embodiments may use a peak value determined at phase cut less than 90 degrees for conditions when the phase cut is greater than 90 degrees. Still further embodiments may use a predetermined peak value (e.g., a peak value corresponding to a rated voltage of the apparatus) for phase cuts above 90 degrees.

Figure 7:
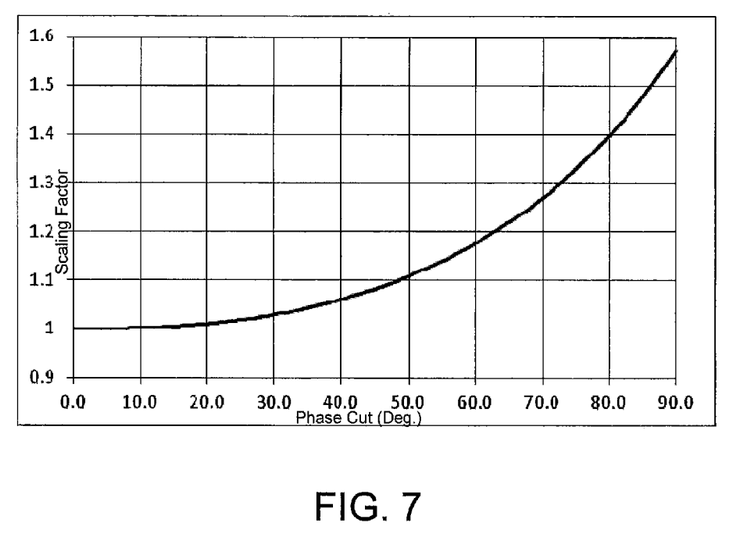
FIG. 7 is a graph of a pulse duration adjustment for dimming according to some embodiments.

Adjustment of pulse width to compensate for dimming may involve identifying an appropriate point at which to cease compensating for the presence of the dimmer. As noted above, many dimmers have a non-zero minimum phase cut. For example, many dimmers have a minimum phase cut of around 45 degrees, and some provide a minimum of around 60 degrees. Accordingly a cutoff between 50 and 60 degrees may be appropriate. FIG. 7 illustrates a dimming transformation that may be applied (e.g., by the phase cut mapping unit 529) according to some embodiments, where the scaling factor applied would be the inverse of the y-axis values shown in FIG. 7 for various phase cut values (x-axis).

The apparatus illustrated in FIG. 5 may be implemented using, for example, a Microchip Technology Inc. PIC16F1782 28-Pin 8-Bit Advanced Analog Flash Microcontroller, which includes functional units that may be utilized as discussed above. However, it will be appreciated that other microcontrollers may be used, and that some embodiments may use different functional unit arrangements than those described above with reference to FIG. 5 based on the functional capabilities of the particular microcontroller used.

Figure 8:
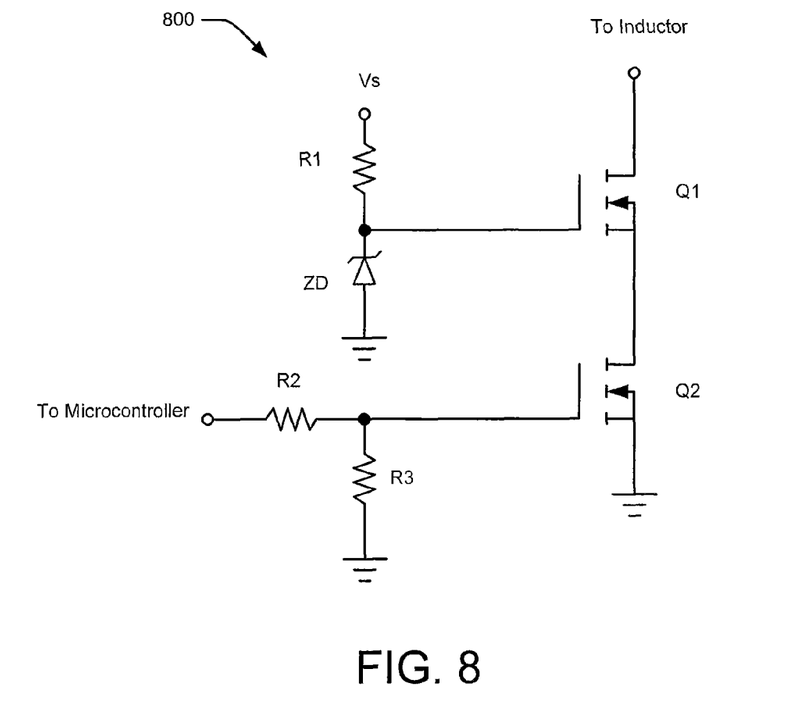
FIG. 8 is a schematic diagram illustrating a circuit implementation for a switch of a switched-mode converter circuit according to some embodiments.

FIG. 8 illustrates an exemplary cascode circuit 800 for implementing the switch S of FIG. 5 according to some embodiments. The cascode switch 800 uses a high threshold FET Q1 having a gate that is biased by a circuit comprising a resistor R1 and a zener diode ZD. The FET Q1 is coupled in series with a relatively low threshold FET Q2 having its gate driven by the output of the microcontroller via a network comprising resistors R2 and R3. This arrangement can eliminate the need for a gate driver. Such an arrangement may be most useful in low wattage applications.

Figure 9:
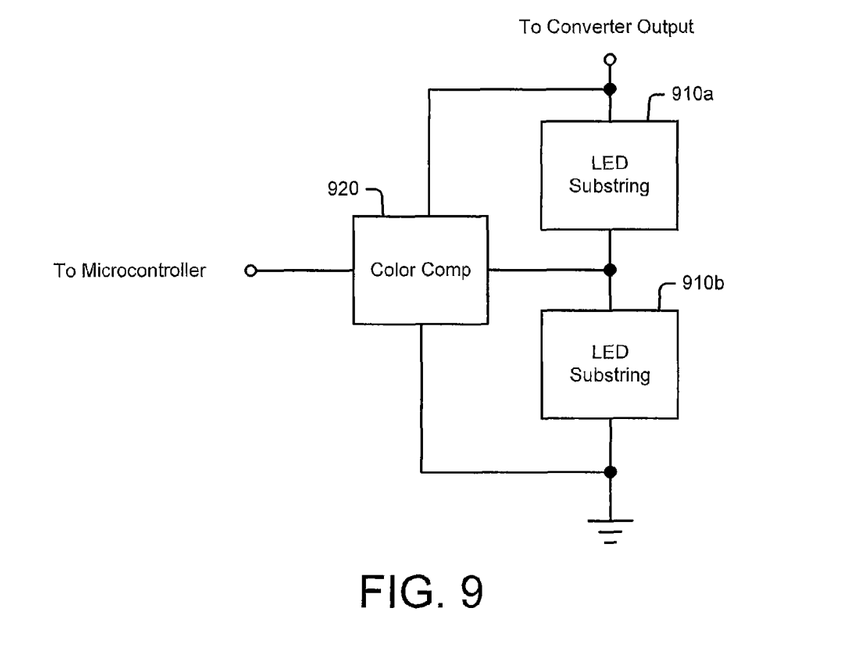
FIG. 9 is a schematic diagram illustrating a color compensation circuit for use with a lighting apparatus according to some embodiments.

FIG. 9 illustrates color control circuitry that may be used in with the microcontroller-based circuitry shown in FIG. 5. An LED string may include two or more substrings 910a, 910b including LEDs with different color outputs (e.g., red and white). A color compensation circuit 920 may control the relative outputs of the substrings 910a, 910b responsive to a control output from the same microcontroller used to provide switched-mode converter control as described above with reference to FIG. 5. The color control may be coordinated with the dimming control described above, e.g., particular color outputs may be associated with particular dimming inputs such that, for example, the LED string produces a color output that approximates the response of an incandescent lamp to the same dimmer input.

Embodiments of the inventive subject matter described above may provide a microcontroller-based solution that uses a relatively small number of external control circuits. The microcontroller may provide both hardware resources and software to effect sensing and control of the switching element.

Figure 10:
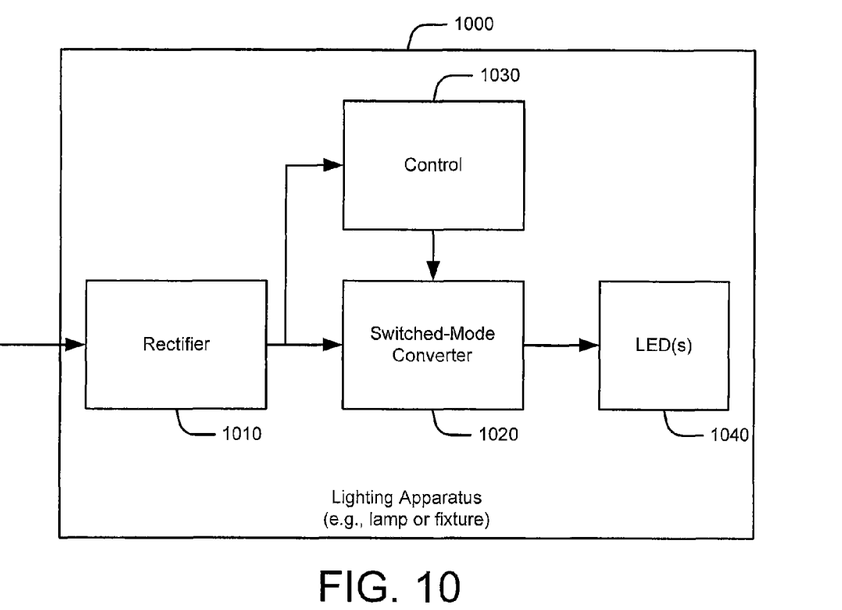
FIG. 10 is a schematic diagram illustrating an integrated lighting apparatus according to some embodiments.
Figure 11:
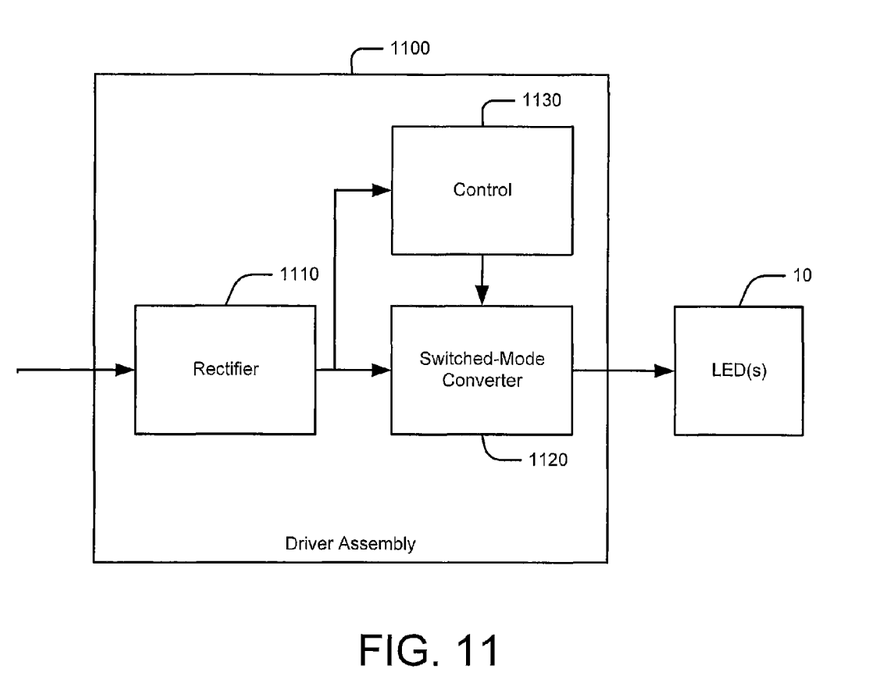
FIG. 11 is a schematic diagram illustrating a driver apparatus for at least one light emitting device according to further embodiments.

The inventive subject matter may be embodied in any of a number of different forms. For example, as shown in FIG. 10, a lighting apparatus 1000 may includes one or more LEDs 1040 in combination with a switched-mode converter circuit 1020 and control circuit 1030 along the lines described above. A rectifier circuit 1010, e.g., a full-wave diode bridge rectifier circuit, may also be included in the apparatus 1000. As shown in FIG. 11, a driver assembly 1100 according to some embodiments may include a rectifier circuit 1110, switched-mode converter circuit 1130 and control circuit 1130 as described above, and may be configured to be connected to one or more LEDs 10.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. An apparatus comprising:
    a switched-mode converter circuit having an output configured to be coupled to at least one light-emitting device, the switched-mode converter circuit comprising an energy storage device and a switch configured to control charging of the energy storage device; and
    a control circuit configured to generate a measure of a voltage magnitude of a time-varying voltage applied to an input of the switched-mode converter circuit and a measure of a dimming level to be applied to the at least one light-emitting device and further configured to generate a pulse width modulated signal having a pulse width that varies responsive to both the measure of the voltage magnitude and the measure of the dimming level and to control the switch of the switched-mode converter circuit responsive to the pulse width modulated signal.

2. The apparatus of claim 1, wherein the control circuit is configured to control the switch without knowledge of a current of the at least one light-emitting device.

3. The apparatus of claim 1, wherein the control circuit comprises:
    a voltage detector configured to generate a magnitude signal indicative of the voltage magnitude;
    a mapping circuit configured to map the magnitude signal to a pulse duration signal; and
    a pulse generation circuit configured to generate the pulse width modulated signal responsive to the pulse duration signal,
    wherein the switch of the switched-mode converter circuit operates responsive to the pulse width modulated signal.

4. The apparatus of claim 3, wherein the control circuit further comprises:
    a dimming level detection circuit configured to generate a dimming signal representative of the dimming level; and
    a dimming compensation circuit configured to generate a dimming compensation signal responsive to the dimming signal; and
    wherein the pulse generation circuit is configured to generate the pulse width modulated signal responsive to the pulse duration signal and the dimming compensation signal.

5. The apparatus of claim 4, wherein the control circuit comprises a scaling circuit configured to scale the pulse duration signal responsive to the dimming compensation signal and wherein the pulse generation circuit is configured to generate the pulse width modulated signal responsive to the scaled pulse duration signal.

6. The apparatus of claim 4, wherein the dimming level detection circuit comprises a phase cut detection circuit configured to generate a phase cut signal indicative of a phase cut applied to the time-varying voltage and wherein the dimming compensation circuit is configured to generate the dimming compensation signal responsive to the phase cut signal.

7. The apparatus of claim 6, wherein the dimming compensation circuit is configured to map a non-zero phase cut to a minimum dimming level.

8. The apparatus of claim 3:
wherein the pulse generation circuit is configured to initiate a pulse of the pulse width modulated signal responsive to a pulse initiation signal; and
wherein the control circuit further comprises a detector circuit configured to generate the pulse initiation signal responsive to discharge of the energy storage device.

9. The apparatus of claim 8, wherein the energy storage device comprises an inductor.

10. The apparatus of claim 9, wherein the detector circuit is configured to generate the pulse initiation signal responsive to a voltage at a terminal of the inductor.

11. An apparatus comprising:
a switched-mode converter circuit having an output configured to be coupled to at least one light-emitting device; and
a control circuit configured to generate a measure of a voltage magnitude of a time-varying voltage applied to an input of the switched-mode converter circuit and a measure of a dimming level to be applied to the at least one light-emitting device and further configured to control a switch of the switched-mode converter circuit responsive to the generated measures, wherein the control circuit comprises:
a voltage detector configured to generate a magnitude signal indicative of the voltage magnitude;
a mapping circuit configured to map the magnitude signal to a pulse duration signal; and
a pulse generation circuit configured to generate a pulse width modulated signal responsive to the pulse duration signal,
wherein the switch of the switched-mode converter circuit operates responsive to the pulse width modulated signal, wherein the voltage detector circuit comprises a peak detector circuit configured to generate a peak voltage signal representative of a peak voltage of the time-varying voltage and wherein the mapping circuit is configured to generate the pulse duration signal responsive to the peak voltage signal.

12. The apparatus of claim 11, wherein the control circuit further comprises:
a phase cut detection circuit configured to generate a phase cut signal representative of a phase cut applied to the time-varying voltage; and
a peak voltage compensation circuit configured to scale the peak voltage signal responsive to the phase cut signal; and
wherein the mapping circuit is configured to generate the pulse duration signal responsive to the scaled peak voltage signal.

13. The apparatus of claim 12, wherein the peak voltage compensation circuit is configured to scale the peak voltage signal when the phase cut signal indicates a phase cut greater than a predetermined amount and to forego scaling the peak voltage signal when the phase cut signal indicates a phase cut less than the predetermined amount.

14. The apparatus of claim 13, wherein the predetermined amount is greater than about a quarter of a cycle of the time-varying voltage.

15. The apparatus of claim 1, wherein the control circuit comprises a microcontroller.

16. The apparatus of claim 1, further comprising a rectifier circuit having an input configured to be coupled to an AC power source and an output coupled to the input of the switched-mode converter circuit.

17. The apparatus of claim 1, further comprising the at least one light emitting device.

18. The apparatus of claim 17, wherein the at least one light emitting device comprises at least one LED.

19. An apparatus comprising:
a switched-mode converter circuit configured to be coupled to at least one light-emitting device and to transfer power thereto responsive to a pulse width modulated signal, the switched-mode converter circuit comprising an energy storage device and a switch configured to control charging of the energy storage device responsive to the pulse width modulated signal; and
a microcontroller configured to provide:
a voltage detection unit configured to generate a first digital value representative of a magnitude of a time-varying voltage applied to an input of the switched-mode converter circuit;
a dimming level detection unit configured to generate a second digital value representative of a dimming level;
a mapping unit configured to generate a pulse duration value responsive to the first digital value;
a dimming compensation unit configured to scale the pulse duration value responsive to the second digital value; and
a programmable switched-mode control (PSMC) unit configured to generate the pulse width modulated signal responsive to the scaled pulse duration value.

20. The apparatus of claim 19, wherein the mapping unit is configured to generate the pulse duration value responsive to the first and second digital values.

21. The apparatus of claim 19, wherein the voltage detection unit comprises:
an analog-to-digital converter (ADC) unit configured to generate digital voltage samples representative of a time-varying voltage applied to an input of the switched-mode converter circuit; and
a peak detector unit configured to generate the first digital value from the digital voltage samples.

22. An apparatus comprising:
a switched-mode converter circuit configured to be coupled to at least one light-emitting device and to transfer power thereto responsive to a pulse width modulated signal; and
a microcontroller configured to provide:
a voltage detection unit configured to generate a first digital value representative of a magnitude of a time-varying voltage applied to an input of the switched-mode converter circuit;
a dimming level detection unit configured to generate a second digital value representative of a dimming level;
a mapping unit configured to generate a pulse duration value responsive to the first digital value;
a dimming compensation unit configured to scale the pulse duration value responsive to the second digital value; and
a programmable switched-mode control (PSMC) unit configured to generate the pulse width modulated signal responsive to the scaled pulse duration value, wherein the dimming level detection unit comprises a phase cut detection unit.

23. The apparatus of claim 22, wherein the phase cut detection unit comprises:
an analog comparator unit configured to generate a digital pulse signal responsive to the time-varying voltage; and
a capture unit configured to generate the second digital value responsive to the digital pulse signal.

24. The apparatus of claim 23, wherein the analog comparator unit comprises a first analog comparator unit, wherein the microcontroller is further configured to provide a second analog comparator unit configured to generate a pulse initiation signal responsive to discharge of an energy storage device of the switched-mode converter circuit and wherein the PSMC unit is configured to initiate a pulse of the pulse width modulated signal responsive to the pulse initiation signal.

25. The apparatus of claim 19, further comprising a color point control circuit configured to be coupled to the at least one light-emitting device, and wherein the microcontroller is further configured to control the color point control circuit.

26. The apparatus of claim 19, further comprising a rectifier circuit having an input configured to be coupled to an AC power source and an output coupled to an input of the switched-mode converter circuit.

27. The apparatus of claim 19, further comprising the at least one light emitting device.

28. The apparatus of claim 27, wherein the at least one light emitting device comprises at least one LED.

29. A method of operating a switched-mode converter circuit having an output coupled to at least one light-emitting device and comprising an energy storage device and a switch configured to control charging of the energy storage device, the method comprising:
   generating a measure of a voltage magnitude of a time-varying voltage applied to an input of the switched-mode converter circuit;
   generating a measure of a dimming level to be applied to the at least one light-emitting device;
   generating a pulse width modulated signal having a pulse width that varies responsive to both the measure of the voltage magnitude and the measure of the dimming level; and
   controlling the switch of the switched-mode converter circuit responsive to the pulse width modulated signal.

30. The method of claim 29:
wherein generating a measure of a voltage magnitude of the time-varying voltage comprises generating a measure of a peak voltage of the time-varying voltage; and
wherein generating a pulse width modulated signal having a pulse width that varies responsive to both the measure of the voltage magnitude and the measure of the dimming level comprises:
   mapping the measure of the peak voltage to a pulse duration; and
   applying the pulse duration to the pulse width modulated signal.

31. The method of claim 30:
wherein generating a measure of a dimming level to be applied to the at least one Light-emitting device comprises generating a measure of a phase cut applied to the time-varying voltage;
wherein applying the pulse duration to the pulse width modulated signal comprises:
   adjusting the pulse duration based on the measure of the phase cut; and
   applying the adjusted pulse duration to the pulse width modulated signal.

32. The method of claim 31, wherein mapping the measure of the peak voltage to a pulse duration comprises:
   adjusting the measure of the peak voltage based on the measure of the phase cut; and
   mapping the adjusted measure of the peak voltage to the pulse duration.

33. The method of claim 29, wherein generating a measure of a voltage magnitude of a time-varying voltage applied to an input of the switched-mode converter circuit and generating a measure of a dimming level to be applied to the at least one light-emitting device are performed by a microcontroller.

\* \* \* \* \*

UNITED STATES PATENT AND TRADEMARK OFFICE
CERTIFICATE OF CORRECTION

PATENT NO. : 9,681,507 B2
APPLICATION NO. : 14/553004
DATED : June 13, 2017
INVENTOR(S) : Ihor Lys and Ashish Ekbote Page 1 of 1

It is certified that error appears in the above-identified patent and that said Letters Patent is hereby corrected as shown below:

In the Specification

In Column 12, Line 36, delete "signal,", and insert -- signal, and --, therefor.

In the Claims

Column 16, Line 14, Claim 31 delete "Light-emitting", and insert -- light-emitting --, therefor.

Column 16, Line 34, Claim 31 delete "device are", and insert -- device is --, therefor.

Signed and Sealed this
Thirty-first Day of July, 2018

Andrei Iancu
*Director of the United States Patent and Trademark Office*